United States Patent [19]
Aljundi

[11] Patent Number: 5,163,735
[45] Date of Patent: Nov. 17, 1992

[54] REDUCED PRE-LOCK TRAVEL SEAT BACK HINGE INERTIA LOCK

[75] Inventor: Safwan Aljundi, Ann Arbor, Mich.

[73] Assignee: Ford Motor Company, Dearborn, Mich.

[21] Appl. No.: 730,146

[22] Filed: Jul. 15, 1991

[51] Int. Cl.$^5$ .............................................. B60N 2/02
[52] U.S. Cl. .................................... 297/378; 297/379; 297/366
[58] Field of Search ................ 297/378, 379, 367, 366

[56] References Cited

U.S. PATENT DOCUMENTS

| | | | |
|---|---|---|---|
| 3,299,466 | 1/1967 | Werner | 297/366 X |
| 3,333,892 | 8/1967 | Werner et al. | 297/379 |
| 3,356,415 | 12/1967 | Putsch | 297/379 |
| 3,848,923 | 11/1974 | Dehler | 297/366 |
| 4,147,386 | 4/1979 | Stolper | 247/379 X |
| 4,225,177 | 9/1980 | Klüting | 297/216 |
| 4,294,488 | 10/1981 | Pickles | 297/379 X |
| 4,402,547 | 9/1983 | Weston et al. | 297/379 |
| 4,438,974 | 3/1984 | Kresky et al. | |
| 4,707,010 | 11/1987 | Croft et al. | |
| 4,733,912 | 3/1988 | Secord | 297/379 |
| 4,747,641 | 5/1988 | Bell | 297/379 |

FOREIGN PATENT DOCUMENTS

| | | | |
|---|---|---|---|
| 2605522 | 8/1977 | Fed. Rep. of Germany | 297/367 |
| 1419518 | 10/1965 | France | 297/366 |

*Primary Examiner*—Jose V. Chen
*Attorney, Agent, or Firm*—Roger L. May; Daniel M. Stock

[57] ABSTRACT

An inertia latch for a vehicle seat backrest 16 is disclosed. The inertia latch includes a wheel 26 having a pinion gear 34 which engages a sector plate 24 by gear teeth 32 which engage sector plate teeth 36. As the backrest 16 is shifted on rapid deceleration, the wheel 26 rapidly drives a locking tooth 38 into engagement with a locking pawl 40 at the lower end of the inertia pendulum 28. Inertia pendulum 28 is rotated upon application of an inertial load into an interlocking relationship with locking tooth 38. A tilt control pinion gear 47 engages a tilt sector plate 48 to adjust the orientation of the seat back relative to the seat bottom.

10 Claims, 2 Drawing Sheets

REDUCED PRE-LOCK TRAVEL SEAT BACK HINGE INERTIA LOCK

TECHNICAL FIELD

This invention relates to inertia locks for vehicle seat back hinges. More particularly, this invention relates to a seat back tilt lock having an inertia pendulum engaged by a rotatable interlock which reduces seat back travel prior to locking upon deceleration.

BACKGROUND OF INVENTION

Vehicle seats in two-door, or coupe style, vehicles are hinged to permit access by passengers to the back seat of the vehicle by pivoting the front seat back forward. Such vehicle seats include a latch mechanism which prevents pivoting the seat back at other times. Manual latches prevent pivoting the vehicle seat back except when the manual latch is released. A more convenient latch mechanism is an inertia latch which locks the seat back hinge upon application of inertial force when the vehicle decelerates rapidly.

One example of an inertia seat back lock is disclosed in U.S. Pat. No. 4,438,974 to Kresky, et al. The Kresky device is directed to a specialized inertia pendulum which prevents lock-up when a car is parked in a nose-down position. It is considered desirable to provide more positive control of the positioning of the seat back in response to deceleration. A second pendulum has been proposed to reduce the pre-lock travel. This approach has been adopted on some car models. By providing the second pendulum, the already excessive number of parts required by the Kresky design is further increased. Adding parts to a seat back hinge inertia lock is undesirable as it adds cost to the assembly.

Another inertial lock for a vehicle seat is disclosed in U.S. Pat. No. 4,225,177 to Kluting, wherein a pinion gear is shifted forward in a slot to engage a locking member located adjacent to the slot. The design disclosed in Kluting is a relatively complicated structure that requires difficult assembly and operational requirements. The number of parts also affects the weight of the tilt lock mechanism. Critical weight reduction standards currently imposed on automotive designs pose an important constraint which must be addressed in seat back tilt lock mechanisms.

These and other problems encountered by the prior art are solved by this invention as summarized below.

DISCLOSURE OF INVENTION

The present invention relates to a vehicle seat hinge for a vehicle seat having a seat portion and a backrest. The hinge includes a backrest bracket and a seat portion bracket which are hinged together for pivoting through a limited range of movement of the backrest bracket relative to the seat portion bracket. An inertia pendulum is pivotally connected to the backrest bracket and includes a locking pawl on its lower end. A sector plate is formed on the hinge means and is fixed relative to the seat portion bracket. A wheel having a pinion gear disposed on one side thereof is rotatably mounted on the backrest bracket so that the pinion gear rides upon the arcuate portion of the sector plate. The wheel has a locking tooth extending from its outer edge at a greater radius from the center of the wheel than the pinion gear teeth. The inertia pendulum is weighted to rotate the locking pawl into a non-engaging position relative to said locking tooth when the seat back is pivoted forward to provide access to a rear seat. The locking pawl of the inertia pendulum is shifted to an engaging position relative to the locking tooth when an inertial force from a frontal impact or rapid braking is applied to the inertia pendulum.

According to another aspect of the invention, the vehicle seat hinge as described above includes a backrest bracket having a cam surface which is engaged by a follower portion formed on the inertia pendulum. The follower rides over the cam surface to control the position of the inertia pendulum under normal operating conditions.

A further aspect of the invention is that the pinion gear reduces pre-lock travel of the seat back by rotating the locking tooth at an increased rate of speed as compared with the speed of rotation of the pinion gear teeth.

According to another aspect of the invention, the hinge further includes a tilt adjustment interconnection between the seat back bracket and the seat portion bracket. The tilt adjustment allows for changing the point of fixation of the sector plate relative to the seat portion bracket. The tilt adjustment interconnection preferably includes a tilt sector plate and a tilt control pinion gear which engages the tilt sector plate.

It is an object of the present invention to provide a vehicle seat hinge for a vehicle seat having a seat portion and a backrest with a pivot which connects a backrest bracket and a seat portion bracket for limited pivoting movement of the backrest bracket relative to the seat portion bracket. The invention features an inertial locking means operating on the pivot to lock the pivot upon application of an inertial load of pre-determined magnitude upon deceleration. The inertia locking means has an arcuate sector plate which is secured to one of the brackets and a wheel including a pinion gear associated with the other of the brackets. The pinion gear has gear teeth which are adapted to engage the sector plate at a first radius from the center of the gear and a locking tooth is disposed at a greater radial distance from the center of the gear than the first radius. An inertia pendulum is provided which is shiftable between a normal non-locking position and a locked position. The inertia pendulum is biased into the normal position unless an inertial load is applied wherein a locking pawl of the inertia pendulum is engaged by the locking tooth.

It is an object of the invention to provide a vehicle seat hinge having an inertial lock which minimizes pre-lock travel through the use of a mechanical motion amplifying linkage.

It is also an object to minimize non-emergency operational problems encountered with prior art vehicle seat inertia lock systems.

It is another object of the invention to provide a vehicle seat hinge which is not prone to inadvertent lock-up when the vehicle is parked on an incline.

It is yet another object to provide an inertia lock for a seat back hinge which is of limited cross-sectional thickness and can be manufactured with weight savings. The inertia lock system realizes weight savings by including the minimum number of moving parts and in particular, an inertia pendulum for simplicity and ease of manufacture.

These and other objects are achieved by applicant's invention as shown in the attached drawings and described below.

BEST MODE FOR CARRYING OUT INVENTION

Figure 1:
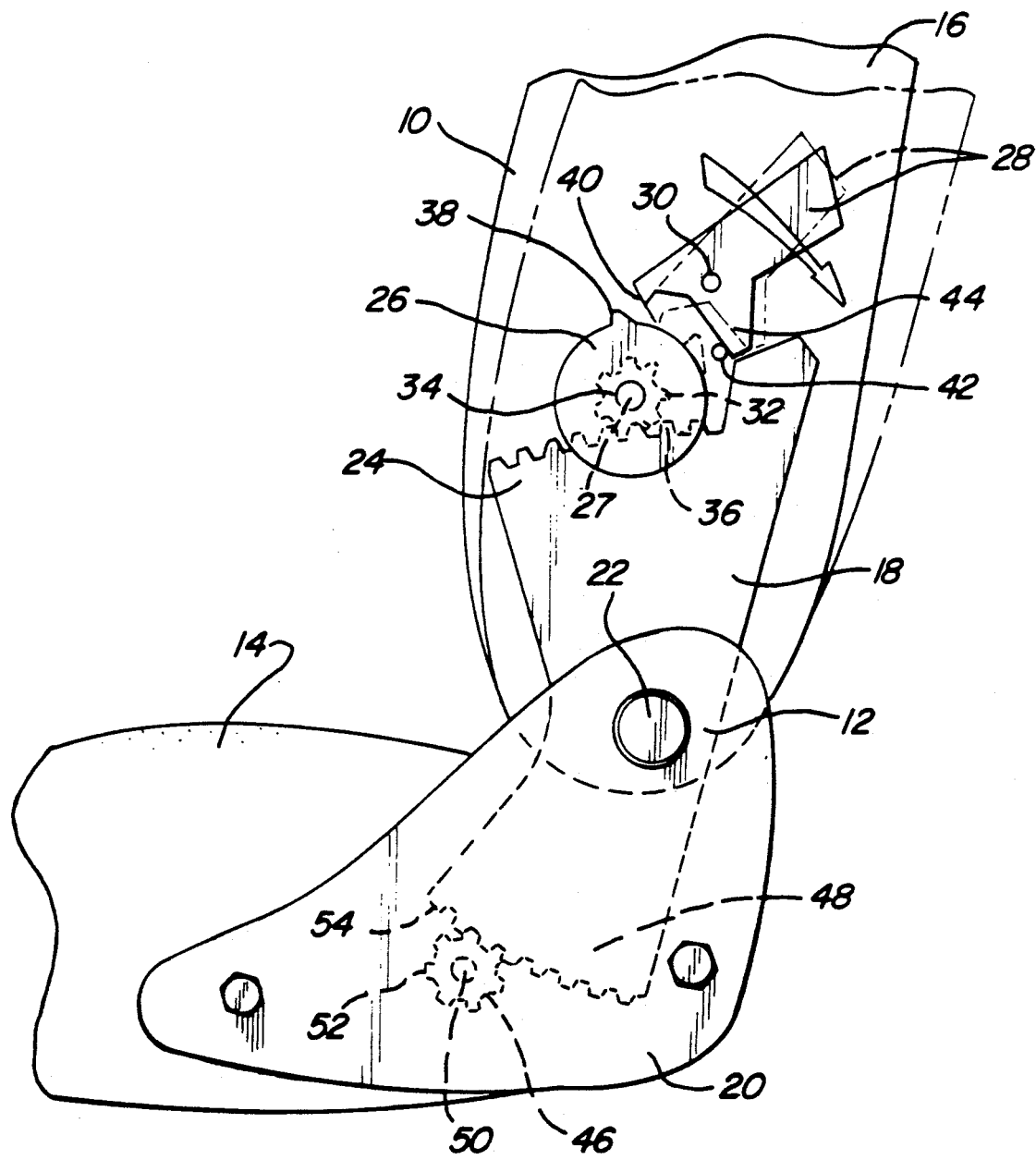
FIG. 1 is a side elevation view showing a seat back inertia latch made in accordance with the present invention in its normal operating mode.

Referring now to the drawings, this invention will be described in greater detail. In FIG. 1, the vehicle seat 10 and hinge 12 connecting the seat portion 14 to a backrest 16 is illustrated. The hinge 12 includes a backrest bracket 18 and a seat portion bracket 20 which are secured together for limited pivoted movement by a hinge pin 22.

The backrest bracket 18 includes a sector plate 24. A wheel 26 engages the sector plate 24. When sector plate 24 is moved during pivoting movement of the backrest 16 the wheel 26 rotates about a pin 27. An inertia pendulum 28 provides an inertia responsive lock. The inertia pendulum 28 is mounted on a pivot pin 30 and is gravity biased towards a non-locking position shown in FIG. 1. The directional arrow overlying the inertia pendulum 28 represents the gravitational biasing force. The wheel 26 includes a series of gear teeth 32 preferably formed on a pinion gear 34 on one side of the wheel 26. The gear teeth 32 are adapted to engage sector plate teeth 36 formed on the sector plate 24. A locking tooth 38 is formed on the outer periphery of the wheel 26.

Figure 2:
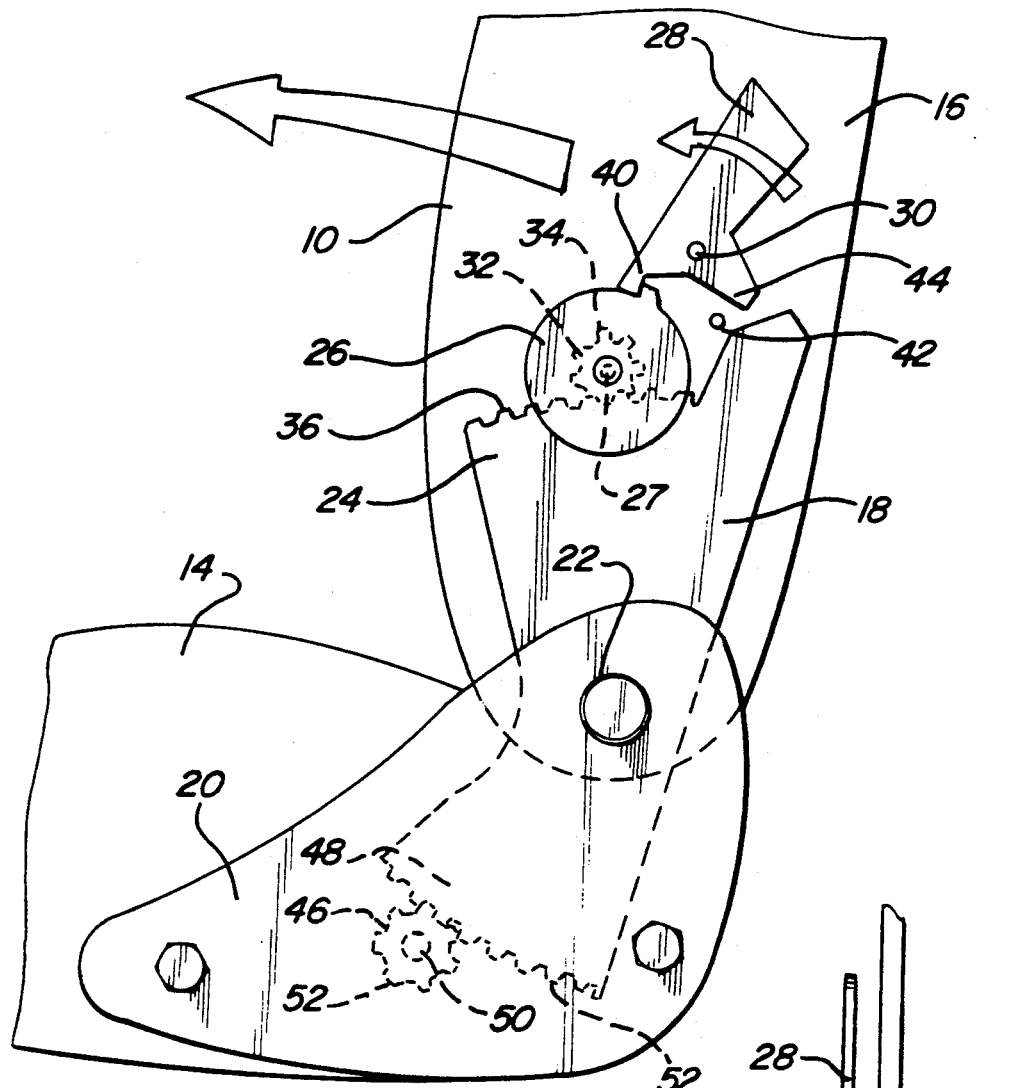
FIG. 2 is a side elevation view showing a seat back hinge inertia lock when an inertial force from deceleration is to the inertia latch.

Referring now to FIG. 2, a locking pawl 40 under the lower end of the inertia pendulum 28 may be moved into locking engagement with the locking tooth 38 when an inertial force represented by the large arrow pointing forward in FIG. 2 is applied to the vehicle seat such as by a frontal impact or by a severe braking force. The inertial force causes the inertia pendulum 28 to rotate about the pivot pin 30 as represented by the smaller arrow overlying the inertia pendulum 28 in FIG. 2. When rotated to this position the locking pawl 40 is engaged by the locking tooth 38. According to the invention, the wheel 26 reduces the pre-lock travel of the backrest 16 by causing an amplification of the movement of the locking tooth 38. As the sector plate teeth 36 turn the pinion gear 34 a given arcuate distance, the locking tooth 38 moves a greater distance to its lock-up position.

When the inertia pendulum 28 is in its normal or non-locking position, a stop tab 42 is engaged by an arm 44 extending rearwardly from the inertia pendulum. Stop tab 42 holds the inertia pendulum 28 in its non-locking position but ready for immediate shifting into its lock-up position upon application of an inertial force of predetermined severity. The lower section of the inertia pendulum arm 44 defines a follower portion 45 which engages a cam surface 46 on the top portion of the back rest bracket 18. At the lower end of the backrest bracket 18 a tilt control pinion gear 47 is provided which is used to adjust the tilt orientation of the backrest 16 relative to the seat portion 14. The tilt control pinion gear 47 engages a tilt sector plate 48 at the lower end of the backrest bracket The tilt control pinion gear 47 is secured by a pin 50 to the seat portion bracket 20. The tilt control pinion gear 47 includes gear teeth 52 which engage corresponding sector plate teeth 54 formed on the tilt sector plate 48.

Figure 3:
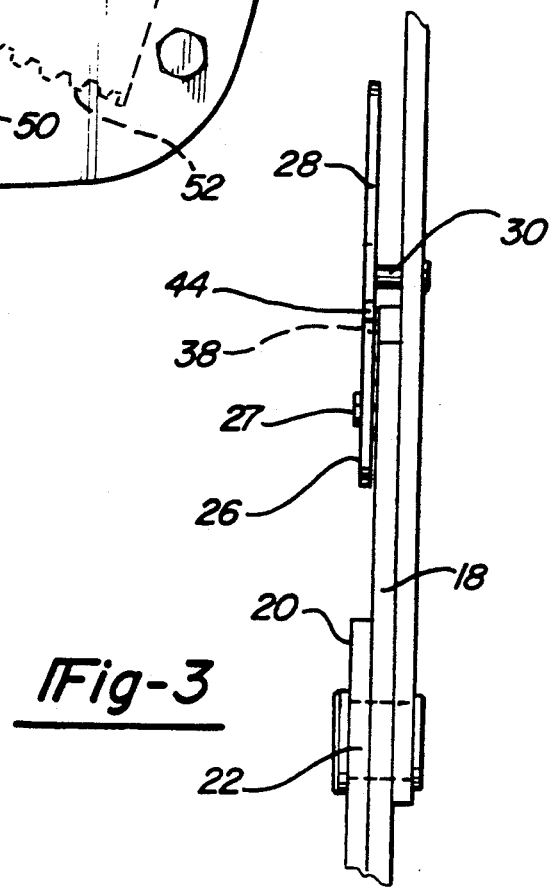
FIG. 3 is a fragmentary rear elevation view showing a vehicle seat hinge having an inertial lock.

Referring now to FIG. 3, the backrest bracket 18 and seat portion bracket 20 are shown interconnected by the hinge pin 22. The wheel 26 locking tooth 38 of the extends laterally toward the backrest bracket 18 to establish an interfering relationship with the locking pawl 40 of the inertia pendulum 28. The inertia pendulum 28 rotates on a pivot pin 30 while the wheel 26 is rotatable about pin 27.

The foregoing description is of a preferred embodiment of the present invention and is not to be read as limiting the invention. The scope of the invention should be construed by reference to the following claims.

I claim:

1. A vehicle seat hinge for a vehicle seat having a seat portion and a backrest comprising:
   a backrest bracket;
   a seat portion bracket;
   hinge means connecting said backrest bracket and said seat portion bracket for pivoting movement of said backrest bracket relative to said seat portion bracket through a limited range of movement;
   an inertia pendulum having a locking pawl on its lower end;
   an axis, about which said inertia pendulum rotates, normal to the direction of rotation of said seat backrest bracket, said axis pivotally connecting said inertia pendulum to said backrest bracket;
   a sector plate having a series of teeth in an arcuate array formed on said hinge means and being fixed relative to said seat portion bracket;
   a wheel connected to said seat backrest bracket having a pinion gear on one side including gear teeth, said pinion gear being rotatably mounted on said backrest bracket to ride upon said arcuate portion of said sector plate, said wheel having a locking tooth extending therefrom at a greater radius than said pinion gear teeth;
   said inertia pendulum being weighted to rotate said locking pawl to a non-engaging position relative to said locking tooth when the seat back is pivoted forward to provide ingress and egress clearance and said locking pawl of said inertia pendulum being shifted to an engaging position relative to said locking tooth when inertial forces are applied to said inertia pendulum.

2. The vehicle seat hinge of claim 1 wherein said backrest bracket includes a cam surface and said inertia pendulum includes a follower portion which rides on said cam surface to control the position of said inertia pendulum under normal conditions.

3. The vehicle seat hinge of claim 1 wherein said wheel reduces pre-lock travel of said seat back by rotating said locking tooth at an increased rate of speed as compared with the speed of rotation of said pinion gear teeth.

4. The vehicle seat hinge of claim 1 wherein said hinge means further includes a tilt adjustment interconnection between said backrest bracket and said seat portion bracket.

5. The vehicle seat hinge of claim 4 wherein said tilt adjustment interconnection includes a tilt sector plate and a tilt control pinion gear which engages said tilt sector plate to change the point of fixation of the tilt sector plate relative to said seat portion bracket.

6. A vehicle seat hinge for a vehicle seat having a seat portion and a backrest comprising:
- a backrest bracket;
- a seat portion bracket;
- pivot means connecting said backrest bracket and said seat portion bracket for limited pivoting movement of said backrest bracket relative to said seat portion bracket;
- inertial locking means operating on said pivot means for locking said pivot means upon application of an inertial load of pre-determined magnitude from a generally longitudinal direction, said inertial locking means having an arcuate sector plate secured to one of said brackets and a wheel associated with the other of said brackets, said wheel having a pinion gear on one side including gear teeth for engaging said sector plate at a first radius from the center of said gear, said wheel and said pinion gear connected to rotate about a common axis, said wheel also having a locking tooth disposed at a greater radial distance from the center of said gear than said gear teeth, and an inertia pendulum pivotally mounted in close proximity to said wheel and being shiftable between a normal non-locking position and a lock-up position, said inertia pendulum being biased into said normal position unless an inertial load is applied wherein a locking pawl portion of said inertia pendulum is engaged by said locking tooth.

7. The vehicle seat hinge of claim 6 wherein said seat portion bracket includes a cam surface and said inertia pendulum includes a follower portion which rides on said cam surface to control the position of said inertia pendulum under normal conditions.

8. The vehicle seat hinge of claim 6 wherein said wheel reduces pre-lock travel of said seat back by rotating said locking tooth at an increased rate of speed as compared with the speed of rotation of said pinion gear teeth.

9. The vehicle seat hinge of claim 6 wherein said hinge means further includes a tilt adjustment interconnection between said seat back bracket and said seat portion bracket.

10. The vehicle seat hinge of claim 9 wherein said tilt adjustment interconnection includes a tilt sector plate and a tilt control pinion gear which engages said tilt sector plate to change the point of fixation of the tilt sector plate relative to said seat portion bracket.

* * * * *